Feb. 17, 1948.    J. D. MINER, JR., ET AL    2,436,320
DYNAMO-ELECTRIC MACHINE
Filed March 11, 1944

WITNESSES:
C. J. Weller
F. P. Lyle

INVENTORS
John D. Miner Jr. and
Joseph E. Mulheim.
BY O. B. Buchanan
ATTORNEY

Patented Feb. 17, 1948

2,436,320

UNITED STATES PATENT OFFICE 2,436,320

DYNAMOELECTRIC MACHINE

John D. Miner, Jr., and Joseph E. Mulheim, Lima, Ohio, assignors to Westinghouse Electric Corporation, East Pittsburgh, Pa., a corporation of Pennsylvania Application March 11, 1944, Serial No. 526,012

8 Claims. (Cl. 171—252)

The present invention relates to the ventilation of dynamo-electric machines and, more particularly, to a construction which provides adequate ventilation for both bearings of dynamo-electric machines of small size and high capacity, such as aircraft generators, although the invention is also applicable to other types of dynamo-electric machines.

Aircraft generators must be made as small and as light as possible, but they must also have relatively high capacity in order to supply the electrical loads on modern aircraft. Because of these requirements, aircraft generators operate at considerably higher temperatures than other types of dynamo-electric machines, and the problem of ventilation is very important. Ventilating air is usually supplied to aircraft generators by means of a blast tube which draws air from the forward movement of the airplane, and the air is directed into one end of the generator, usually the front or commutator end, and passes through the ventilating passages in the machine and is discharged from the other end. In machines of conventional construction ventilated in this manner, the front bearing at the end where the cooling air enters is cooled sufficiently since it is exposed to the direct flow of cooling air, but the rear bearing at the opposite end of the machine is not adequately cooled since it is not directly exposed to any flow of air and is cooled only by conduction of heat from the bearing through other parts of the machine to surfaces which are directly cooled by the ventilating air. For this reason, the rear bearing runs at a considerably higher temperature than the front bearing. High-temperature lubricants are available which provide adequate lubrication for the bearings over a wide range of temperatures, but the high temperature at which the rear bearing operates results in rapid deterioration of the lubricant, with correspondingly short life for the bearing in service.

The principal object of the present invention is to provide a dynamo-electric machine of relatively small size and high capacity in which all parts of the machine, including both bearings, are adequately cooled.

A more specific object of the invention is to provide a construction for dynamo-electric machines in which cooling air supplied to one end of the machine flows through a hollow shaft to the opposite end of the machine, and is caused to flow directly across the bearing at that end of the machine to cool it.

A further object of the invention is to provide a construction for dynamo-electric machines in which cooling air supplied to one end of the machine flows through a hollow shaft to the other end of the machine, and in which means are provided on the shaft for directing the air flowing through the shaft across the rear bearing of the machine and for also assisting in producing a flow of air through other ventilating passages of the machine.

The invention will be more fully understood from the following detailed description, taken in connection with the accompanying drawing, in which.

Figure 1:
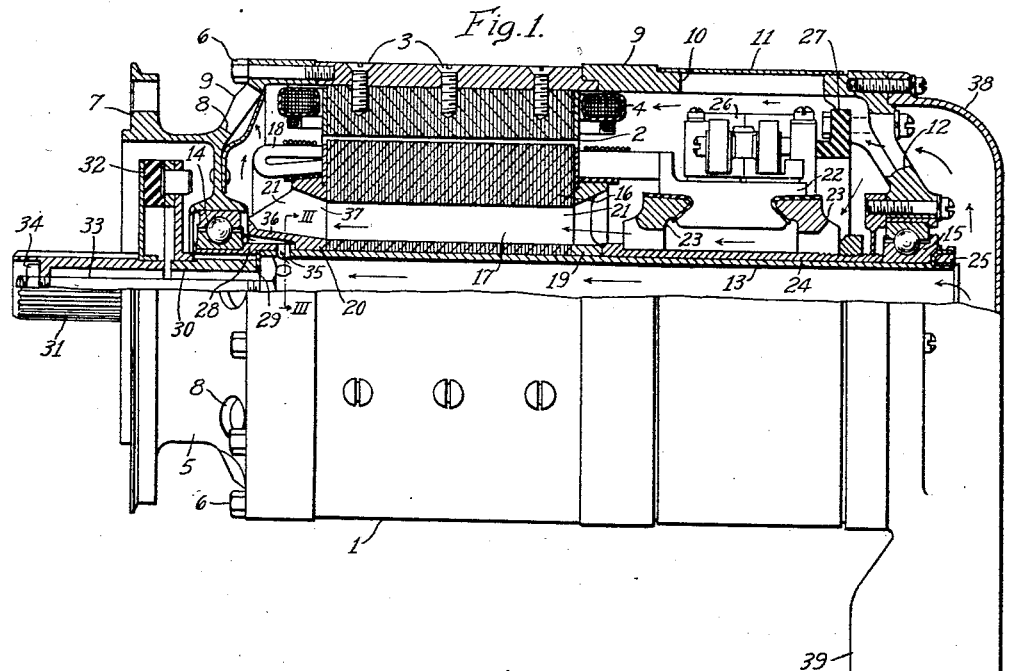
Figure 1 is a side elevation, partly in longitudinal section, of a machine embodying the invention.
Figure 2:
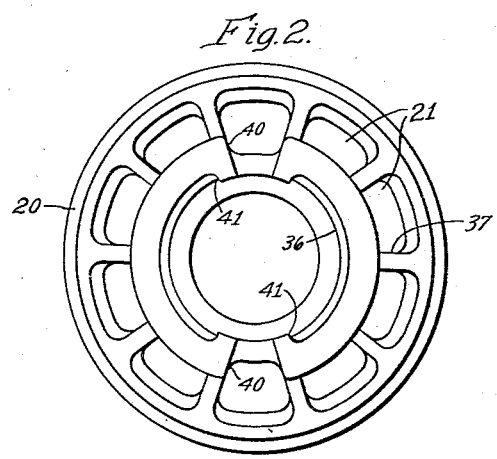
Fig. 2 is an end elevation of a spider element.
Figure 3:
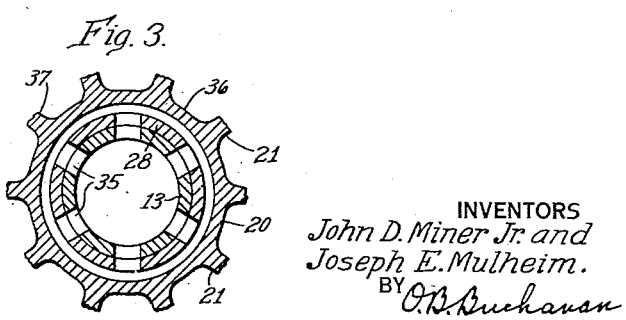
Fig. 3 is a fragmentary transverse sectional view approximately on the line III—III of Fig. 1.

The drawing shows the invention as embodied in a direct-current aircraft generator, although it will be understood that the construction shown may also be used in other types of machines. The generator shown in the drawing has a frame 1, and a plurality of pole pieces 2 are mounted on the frame 1 by means of screws 3. Field windings 4 are placed on the pole pieces 2 to provide the required field excitation. One end of the frame 1 is closed by an end bracket 5 which is secured to the frame in any suitable manner, as by screws 6. The end bracket 5 includes a mounting flange 7 for mounting the generator in position, and has a plurality of holes 8 to permit the escape of ventilating air passing through the machine from the opposite end. The other end of the frame 1 is closed by an end bracket 9 secured to the frame in any suitable manner. The end bracket 9 is designed to extend over the commutator of the generator and may be provided with openings 10 to permit access to the brushes, the openings 10 being normally closed by a removable cover 11. The end bracket 9 also has a plurality of openings 12 for the entrance of ventilating air into the machine.

The rotor member of the generator includes a hollow shaft 13, which is supported for rotation in bearings 14 and 15 mounted in the end brackets 5 and 9, respectively. The bearings 14 and 15 have been shown as ball bearings, but it will be understood that any other suitable type of bearings might be used. The rotor member has a laminated rotor core 16 having a plurality of axial ventilating passages 17 extending through it, and a rotor winding 18 of any suitable type is placed in slots in the core 16. A rotor spider 19 is provided at one end of the core 16 and a spider 20 is provided at the opposite end. The outer surfaces of the spiders 19 and 20 are shaped to provide coil supports for the extending end portions of the rotor winding 18, and each of the spiders 19 and 20 has a plurality of openings 21 corresponding in number and position with the axial passages 17, to permit air to flow through these passages.

The rotor member also includes the commutator 22, which is supported on the shaft by means of commutator spiders 23, which have passages through them for the passage of ventilating air, as clearly indicated in the drawing. The commutator spiders 23 may be mounted on a sleeve or bushing 24 which is pressed onto the shaft 13, and the inner race of the front bearing 15 is pressed onto the shaft 13 against the end of the bushing 24 and retained in position by means of a nut 25 threaded on the end of the shaft 13. Brushes and brush holders 26 of any suitable type are supported on a rocker ring 27 which is mounted on the end bracket 9.

As previously mentioned, the shaft 13 is hollow and is open at the front end of the machine, or the right-hand end as seen in Fig. 1, so that ventilating air may enter the shaft and flow through it. At the opposite or left-hand end of the shaft, a shaft extension 28 is brazed to the shaft 13 and forms an integral extension of the shaft, the inner race of the rear bearing 14 being pressed on the extension 28. A washer 29 is held between the end of the shaft 13 and an internal shoulder in the extension 28, the washer partially closing the end of the hollow shaft. The shaft extension 28 is internally splined, and an externally splined stub shaft 30 is engaged in the extension 28. A splined drive shaft 31 for connection to the driving means for the generator is aligned with the stub shaft 30 and is connected to it by a resilient coupling 32 of any suitable type. The coupling assembly is held in position by means of a bolt 33 which is inserted from the opposite end of the shaft so that it passes through the washer 29 with its head engaging the washer, thus closing the end of the shaft. A nut 34 is threaded on the opposite end of the bolt 33 and engages an internal shoulder in the drive shaft 31 to retain the coupling assembly in position with respect to the generator.

A series of radial holes 35 is drilled through the shaft 13 and extension 28 near the end of shaft 13 to permit the air flowing through the shaft to be discharged. This air is intended primarily for the purpose of cooling the rear bearing 14 and means are provided for directing this air to cause it to flow directly across the bearing. In the illustrated embodiment of the invention, the spider 20 is designed for this purpose. As shown in the drawing, the spider has an annular, axially extending portion 36 which extends over the holes 35, and extends almost to the bearing 14, forming an annular space around the shaft through which the air discharged from the holes 35 passes and is thus directed directly across the bearing 14. A small amount of clearance is provided between the end of the portion 36 of the spider 20 and the side of the bearing 14 to permit an adequate amount of air to flow across the bearing, since the amount of heat removed from a surface by a high-velocity stream of air is a function of the quantity of air flowing as well as of the velocity of the air. Two opposed radial slots 40 may be formed in the end surface of the axial portion 36 of the spider 20 to provide clearance for a bearing puller to facilitate removing the bearing 14 when replacement of the bearing becomes necessary. The axial portion 36 is preferably shaped, as indicated at 41, to have a segmental press fit on the shaft extension 28 adjacent the slots 40 so as to prevent the escape of air through the slots.

As previously stated, the spider 20 has a plurality of holes 21 extending through it coinciding in position with the axial passages 17 through the rotor core 16, and these holes are separated by radial portions 37 which are positioned so that when the rotor is rotating the portions 37 of the spider produce a fan effect, which assists in drawing a high velocity stream of air through the passages 17 to provide more effective cooling of the rotor. Thus, the spider 20 has three main functions. It is designed to form a channel or passage, in cooperation with the shaft, for guiding cooling air across the bearing 14; it produces a fan effect to increase the flow of air through the ventilating passages in the rotor; and it serves as a coil support to support the end turns of the rotor winding 18.

During operation of the generator, ventilating air is supplied to the front or right-hand end of the machine. This may conveniently be done by means of a hood 38 attached to the end of the machine and having an inlet portion 39 adapted for connection to a blast tube, or other source of ventilating air. Air entering the machine through the hood 38 flows partly into the hollow shaft 13 and partly through the openings 12 in the end bracket 9 into the interior of the machine, as indicated by the arrows. The air entering the shaft flows longitudinally through it and is discharged through the holes 35 at the opposite end of the shaft, and is guided by the portion 36 of the spider 20 to flow directly across the bearing 14 to cool it. The air flowing through the shaft 13 also assists to some extent in cooling the rotor core 16, but this does not raise the temperature of the air sufficiently to affect seriously its primary purpose of cooling the rear bearing 14. Part of the air entering the interior of the machine through the openings 12 flows across the brush holders and over the pole pieces 2 and field windings 4, while part of the air flows through the passages in the commutator spiders 23 and through the axial passages 17 in the rotor core 16 and is discharged through the openings 21 in the spider 20, the flow of this portion of the air being increased and made more effective by the fan action of the spider 20. The direction of these various streams of cooling air is shown by arrows on the drawing, and all of the air passing through the machine is discharged through the openings 8 in the end bracket 5.

It will be apparent, therefore, that the construction described provides for very effective cooling of the machine, since all parts of the machine, including both bearings, are directly cooled by streams of cooling air. This construction is particularly effective in preventing the temperature of the rear bearing 14 from becoming excessively high, and the use of this construction greatly increases the life of the rear bearing as compared to the usual life of these bearings in aircraft generators of conventional construction. The invention has been described specifically with reference to aircraft generators, but it will be understood that the construction described is also applicable to dynamo-electric machines of other types as well as to those intended for aircraft use.

Although a specific embodiment of the invention has been shown and described for the purpose of illustration, it is to be understood that the invention is not limited to the particular details of construction shown, but in its broadest aspects it includes all equivalent embodiments and modifications which come within the scope of the appended claims.

We claim as our invention:

1. A dynamo-electric machine having a stator member and a rotor member, said rotor member including a hollow shaft open at one end, said shaft having a single continuous, axial passageway therethrough, bearings adjacent opposite ends of the machine for supporting said shaft for rotation, means for directing a stream of cooling air into one end of said machine, a part of said cooling air flowing into the open end of said hollow shaft, said shaft having a plurality of radial holes therethrough adjacent its opposite end for discharging the air flowing through the shaft, and means on the shaft adjacent said holes for causing the air discharged from said holes to flow directly across the bearing at that end of the shaft.

2. A dynamo-electric machine having a stator member and a rotor member, said rotor member including a hollow shaft open at one end, said shaft having a single, continuous, axial passageway therethrough, bearings adjacent opposite ends of the machine for supporting said shaft for rotation, means for directing a stream of cooling air into one end of said machine, a part of said cooling air flowing into the open end of said hollow shaft, said shaft having a plurality of radial holes therethrough adjacent its opposite end for discharging the air flowing through the shaft, and means mounted on the shaft adjacent said holes for directing the stream of air discharged from said holes to cause it to flow directly across the bearing at that end of the shaft.

3. A dynamo-electric machine having a stator member and a rotor member, said rotor member having a plurality of axial ventilating passages and having a hollow shaft open at one end, bearings adjacent opposite ends of the machine for supporting said shaft for rotation, means for directing cooling air into one end of the machine, part of said air flowing into said axial passages and part of the air flowing into the open end of said hollow shaft, said shaft having radial openings adjacent its opposite end for the discharge of the air flowing through the shaft, and means on the shaft adjacent said openings for directing the air discharged through the openings across the bearing at that end of the shaft and for drawing air through the axial passages in the rotor member.

4. A dynamo-electric machine having a stator member and a rotor member, said rotor member having a plurality of axial ventilating passages and having a hollow shaft open at one end, bearings adjacent opposite ends of the machine for supporting said shaft for rotation, means for directing cooling air into one end of the machine, part of said air flowing into said axial passages and part of the air flowing into the open end of said hollow shaft, said shaft having radial openings adjacent its opposite end for the discharge of the air flowing through the shaft, and an annular member mounted on the shaft adjacent said openings, said annular member being adapted to direct the air discharged through the openings across the bearing at that end of the shaft and to draw air through the axial passages in the rotor member.

5. A dynamo-electric machine having a stator member and a rotor member, said rotor member having a plurality of axial ventilating passages and having a hollow shaft open at one end, bearings adjacent opposite ends of the machine for supporting said shaft for rotation, means for directing cooling air into one end of the machine, part of said air flowing into said axial passages and part of the air flowing into the open end of said hollow shaft, said shaft having radial openings adjacent its opposite end for the discharge of the air flowing through the shaft, and an annular spider member mounted on the shaft adjacent said openings, said spider member extending over the openings to form an annular passage around the shaft for directing air discharged from the openings across the bearing at that end of the shaft, and the spider member having openings therethrough coinciding in position with the axial passages in the rotor member and separated by radial portions adapted to function as fan blades to draw air through the axial passages.

6. A dynamo-electric machine having a stator member and a rotor member, said rotor member including a shaft having a single, continuous, axial passage therethrough, bearings adjacent opposite ends of the machine for supporting said shaft for rotation, means for directing cooling air into one end of said machine, said axial passage having an inlet opening adjacent said end of the machine, whereby a part of the cooling air flows into and through the passage, said passage having a discharge opening adjacent the opposite end of the machine, and means for directing the air discharged from the passage to cause it to flow directly across the bearing at that end of the machine.

7. A dynamo-electric machine having a stator member and a rotor member, said rotor member including a shaft having a single, continuous, axial passage therethrough, bearings adjacent opposite ends of the machine for supporting said shaft for rotation, means for directing cooling air into one end of said machine, said axial passage having an inlet opening adjacent said end of the machine, whereby a part of the cooling air flows into and through the passage, said passage having a discharge opening adjacent the opposite end of the machine, and means carried by the shaft for directing air from said discharge opening to the bearing at that end of the machine to cause air discharged from the passage to flow directly across the bearing.

8. A dynamo-electric machine having a stator member and a rotor member, said rotor member including a shaft having a single, continuous, axial passage therethrough, bearings adjacent opposite ends of the machine for supporting said shaft for rotation, means for directing cooling air into one end of said machine, said axial passage having an inlet opening adjacent said end of the machine, whereby a part of the cooling air flows into and through the passage, said passage having a discharge opening adjacent the opposite end of the machine, said discharge opening being spaced from the bearing at that end of the machine, and means between the discharge opening and said bearing for causing air discharged from the passage to flow directly across the bearing.

JOHN D. MINER, Jr.
JOSEPH E. MULHEIM.

REFERENCES CITED

The following references are of record in the file of this patent:

UNITED STATES PATENTS

| Number | Name | Date |
| --- | --- | --- |
| 686,856 | Langdon-Davies | Nov. 19, 1901 |
| 700,335 | Keiley | May 20, 1902 |
| 716,278 | Reist | Dec. 16, 1902 |
| 920,798 | Wiard | May 4, 1909 |
| 1,278,865 | Curtis | Sept. 17, 1918 |
| 1,433,037 | Reid | Oct. 24, 1922 |
| 1,875,203 | Apple | Aug. 30, 1932 |
| 2,214,592 | Mueller | Sept. 10, 1940 |
| 2,285,960 | Fechheimer | June 9, 1942 |